United States Patent
Cho

(10) Patent No.: US 10,431,782 B2
(45) Date of Patent: Oct. 1, 2019

(54) BATTERY PACK

(71) Applicant: Samsung SDI Co., Ltd., Yongin-si, Gyeonggi-do (KR)

(72) Inventor: Mansik Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 147 days.

(21) Appl. No.: 15/374,661

(22) Filed: Dec. 9, 2016

(65) Prior Publication Data

US 2017/0187011 A1   Jun. 29, 2017

(30) Foreign Application Priority Data

Dec. 28, 2015 (KR) .................. 10-2015-0187491

(51) Int. Cl.
| | |
|---|---|
| *H01M 2/10* | (2006.01) |
| *H01M 2/20* | (2006.01) |
| *H01M 10/42* | (2006.01) |
| *H01M 10/48* | (2006.01) |

(52) U.S. Cl.
CPC .......... *H01M 2/105* (2013.01); *H01M 2/204* (2013.01); *H01M 10/425* (2013.01); *H01M 10/482* (2013.01); *H01M 2010/4271* (2013.01); *H01M 2220/30* (2013.01)

(58) Field of Classification Search
CPC .... H01M 2/105; H01M 2/204; H01M 10/425; H01M 210/4271
See application file for complete search history.

(56) References Cited

U.S. PATENT DOCUMENTS

| | | | | |
|---|---|---|---|---|
| 9,184,472 B2 | 11/2015 | Hong | | |
| 2008/0286634 A1* | 11/2008 | Naito | ..................... | H01M 2/105 429/92 |
| 2009/0087694 A1* | 4/2009 | Park | ....................... | H01M 2/04 429/8 |
| 2010/0015519 A1* | 1/2010 | Trester | .................. | H01M 2/202 429/160 |
| 2011/0097619 A1* | 4/2011 | Park | ...................... | H01M 2/105 429/159 |
| 2011/0262777 A1* | 10/2011 | Choi | ..................... | H01M 2/204 429/7 |
| 2012/0052332 A1* | 3/2012 | Ahn | ...................... | H01M 2/202 429/7 |

(Continued)

FOREIGN PATENT DOCUMENTS

| | | |
|---|---|---|
| KR | 10-1065963 | 9/2011 |
| KR | 10-2013-0090098 | 8/2013 |

*Primary Examiner* — Matthew J Merkling
(74) *Attorney, Agent, or Firm* — Lewis Roca Rothgerber Christie LLP

(57) ABSTRACT

A battery pack includes: a plurality of battery cells arranged in parallel with each other, each of the battery cells comprising an electrode terminal at opposite ends thereof; a holder case configured to accommodate the battery cells; a protection circuit module mounted at an external side of the holder case and comprising a cell voltage measuring terminal facing the holder case; and a connection tab comprising a body part electrically connected to the electrode terminals of a group of the battery cells and an extended part extended from the body part to contact and be electrically connected with the cell voltage measuring terminal of the protection circuit module due to tension in the extended part.

12 Claims, 5 Drawing Sheets

(56) References Cited

U.S. PATENT DOCUMENTS

| | | | |
|---|---|---|---|
| 2013/0052487 A1* | 2/2013 | Park | H01M 2/204 429/7 |
| 2013/0202919 A1 | 8/2013 | Hwang | |
| 2013/0330576 A1* | 12/2013 | Kolden | H01M 10/425 429/7 |

* cited by examiner

BATTERY PACK

CROSS-REFERENCE TO RELATED APPLICATION

This application claims priority to and the benefit of Korean Patent Application No. 10-2015-0187491, filed on Dec. 28, 2015 in the Korean Intellectual Property Office, the entire content of which is incorporated herein by reference.

BACKGROUND

1. Field

Aspects of the present invention relate to a battery pack.

2. Description of the Related Art

In general, a battery cell is used as an energy source of an external device, such as a mobile device, an electric vehicle, a hybrid vehicle, and the like, and a form of the battery cell may be variously changed according to the external device to which the battery cell is to be applied.

A small mobile device, such as a mobile phone, may be powered by a single battery cell (e.g., by an output and a capacity of the single battery cell) for a certain amount of time. However, when a relatively long driving or operating time and high driving power are desired, such as for an electric vehicle and/or a hybrid vehicle having high power consumption, a battery pack having a large capacity that is configured by electrically connecting a plurality of battery cells to each other to provide increased output and capacity may be implemented.

In such a battery pack, ones of the battery cells are electrically connected with adjacent ones of the battery cells by a connection tab. Further, the battery pack may provide increased output voltage or output current according to the number of battery cells in the battery pack.

SUMMARY

Aspects of the present invention provide a battery pack in which a connection tab is in close contact with a cell voltage measuring terminal due to tension in (e.g., tension of) the connection tab such that a separate soldering structure or connection between the connection tab and the cell voltage measuring terminal may be omitted.

Additional aspects of the present invention provide a battery pack which omits a monitoring wire, thereby considerably decreasing a defect rate.

An exemplary embodiment of the present invention provides a battery pack including: a plurality of battery cells arranged in parallel with each other, each of the battery cells comprising an electrode terminal at opposite ends thereof; a holder case configured to accommodate the battery cells; a protection circuit module mounted at an external side of the holder case and comprising a cell voltage measuring terminal facing the holder case; and a connection tab comprising a body part electrically connected to the electrode terminals of a group of the battery cells and an extended part extended from the body part to contact and be electrically connected with the cell voltage measuring terminal of the protection circuit module due to tension in the extended part.

The extended part may include: a first bent portion extended from the body part and bent from a surface parallel to the electrode terminals toward an external surface of the holder case; a seating portion extended from the first bent portion and seated on the external surface of the holder case; a second bent portion bent from the seating portion in a direction opposite to a bending direction of the first bent portion; and a tension portion extended from the second bent portion and over the seating portion.

The tension portion may be spaced from the seating portion.

The holder case may include a guide part protruding in an upper direction along a periphery of the seating portion other than a region corresponding to the first bent portion.

The connection tab may include an insertion opening in the seating portion thereof.

The holder case may include a rib on the external surface of the holder case at a position corresponding to the insertion opening, and the rib may be in the insertion opening.

The holder case may include a first fastening opening, and the protection circuit module may include a second fastening opening corresponding to the first fastening opening. The protection circuit module may be fixed to the holder case by a fastening member passing through the first fastening opening and the second fastening opening.

The holder case may include a first holder case and a second holder case, each of which expose the electrode terminals of the battery cells and respectively extend over upper end surfaces and lower end surfaces of the battery cells.

The battery pack may further include a high current tab, and the extended part of the connection tab may be spaced from the high current tab.

According to aspects of the present invention, a connection tab is in contact with a cell voltage measuring terminal due to tension in the connection tab such that a separate soldering structure may be omitted. Therefore, a structure of the battery pack is simplified such that price competitiveness of the battery pack may be improved.

Further, according to additional aspects of the present invention, a monitoring wire may be omitted such that it is possible to considerably decrease a defect rate and more easily service the battery pack after manufacture.

DETAILED DESCRIPTION

Figure 1:
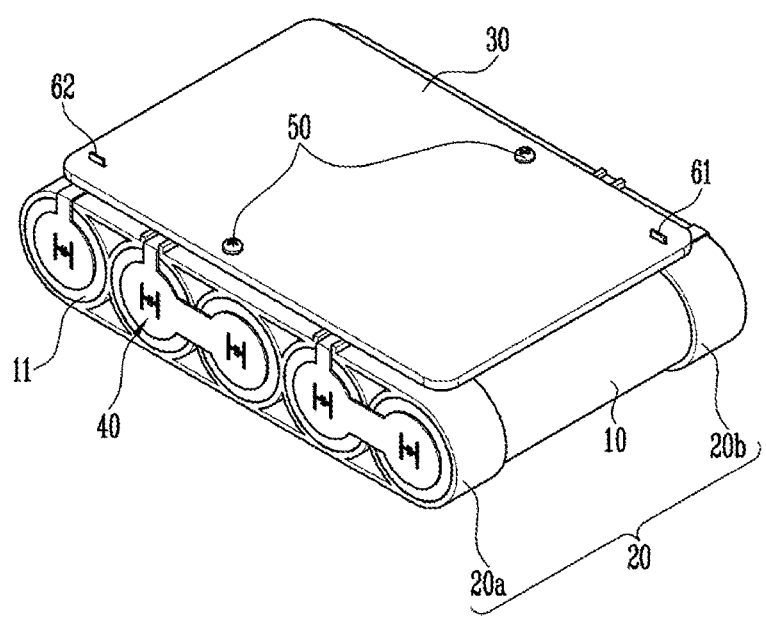
FIG. 1 is a perspective view of a battery pack according to an exemplary embodiment of the present invention.

Hereinafter, exemplary embodiments of the present invention will be described, in detail, with reference to the accompanying drawings. However, the present invention may be implemented in various forms, and the exemplary embodiments described below are for illustrative purposes.

In the following description, when a detailed description of a relevant, known function or configuration is determined to unnecessarily obscure the main features or aspects of the present invention, the detailed description thereof may be omitted.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively. Like reference numerals refer to like elements or components throughout the description.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 2:
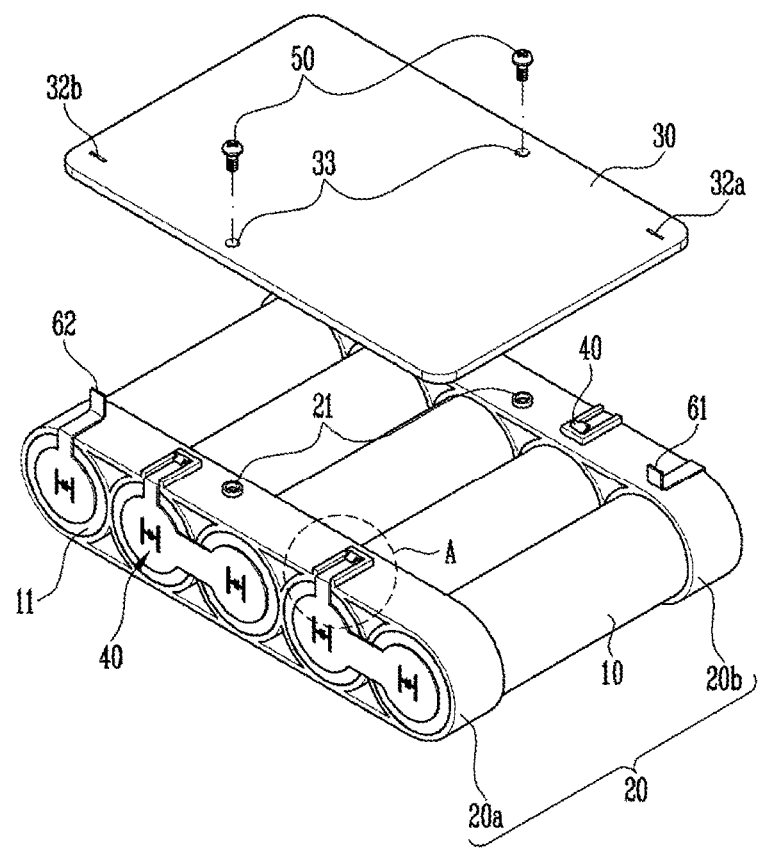
FIG. 2 is an exploded perspective view of the battery pack shown in FIG. 1.
Figure 3:
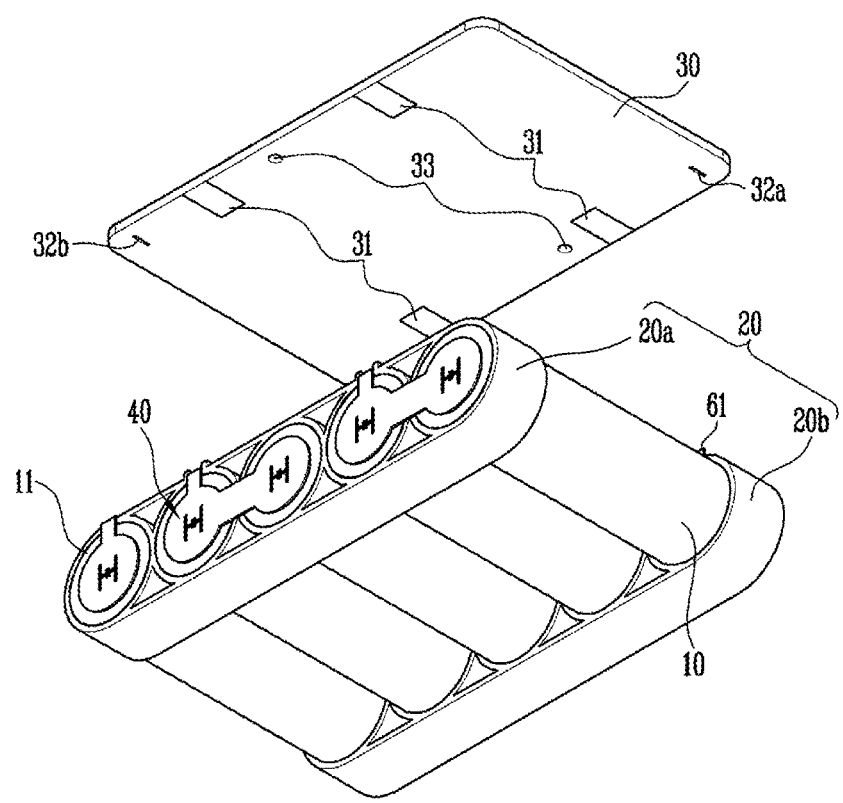
FIG. 3 is a bottom view of FIG. 2.

FIG. 1 is a perspective view illustrating a coupled state of a battery pack according to an exemplary embodiment of the present invention, FIG. 2 is an exploded perspective view of the battery pack shown in FIG. 1, and FIG. 3 is a bottom view of FIG. 2.

Referring to FIGS. 1-3, the battery pack according to the present exemplary embodiment includes a plurality of battery cells 10, a holder case 20 accommodating the plurality of battery cells 10, a protection circuit module 30 (e.g., a protection circuit), and a connection tab 40 which electrically connects adjacent ones of the plurality of battery cells 10 to each other.

The plurality of battery cells 10 may include electrode terminals 11 (e.g., electrode parts) at both ends (e.g., opposite ends) thereof and may be disposed in parallel with each other in a longitudinal direction. Further, the holder case 20 may accommodate the plurality of battery cells 10. The protection circuit module 30 is mounted at an external side of the holder case 20 and includes a cell voltage measuring terminal 31 in a region of the protection circuit module 30 facing the holder case 20 (e.g., a number of cell voltage measuring terminals 31 may correspond to a number of the connection tabs 40). Further, the protection circuit module 30 may include an electronic component and the like therein configured into a protection circuit and the like, and in some embodiments, the protection circuit module 30 is screw-engaged or screw-coupled with the holder case 20 by a fastening member 50. However, the present invention is not limited thereto, and the protection circuit module 30 may be fixed to the holder case 20 by any suitable fastening devices.

Further, the connection tab 40 may include a body part 46 (see, e.g., FIG. 4) electrically connected with (e.g., directly electrically connected with) the electrode terminals 11 of the plurality of battery cells 10 (e.g., of two adjacent battery cells 10) and an extended part 45 positioned so as to correspond to a corresponding one of cell voltage measuring terminals 31 of the protection circuit module 30.

In some embodiments, the extended part 45 of the connection tab 40 may be formed to have a region that is bent so as to have or to be in tension. Accordingly, the extended part 45 and the cell voltage measuring terminal 31 may be in contact and electrically connected with each other due to the tension in the extended part 45. For example, the extended part 45 of the connection tab 40 and the corresponding cell voltage measuring terminal 31 may be connected to each other in a weld-free structure (e.g., without being welded to each other) such that the extended part 45 may be electrically connected with the cell voltage measuring terminal 31. The electrical connection structure between the cell voltage measuring terminal 31 and the extended part 45 will be further described with reference to FIGS. 4 and 5.

A conventional battery pack measures a voltage between the battery cells by connecting a monitoring wire to a connection tab. To this end, the monitoring wire is connected to the protection circuit module, and the monitoring wire and the protection circuit module often need to be connected by soldering or welding. Such a connection structure is complex, and a defect rate of the battery pack is increased due to this complex connection structure. However, according to embodiments of the present invention, the monitoring wire is omitted such that it is possible to considerably decrease a defect rate by foregoing the soldering and the use of the monitoring wire.

In some embodiments, the extended part 45 of the connection tab 40 may be positioned so as to be spaced from (e.g., spaced apart from) high current tabs 61 and 62 of the battery pack by an interval. Because regions in which the high current tabs 61 and 62 are positioned in the battery pack generate a large amount of heat, the extended part 45 of the connection tab 40 measuring a voltage of the battery cell is positioned so as to be spaced from the high current tabs 61 and 62 by the interval so it is not influenced by or is not significantly influenced by the high temperature.

In an exemplary embodiment, reference numerals 61 and 62 indicate the (+) high current tab and the (−) high current tab, respectively, and represent power supply terminals at both ends (e.g., opposite ends) of the plurality of battery cells 10 which are connected to each other in series and/or in parallel. For example, the (+) high current tab 61, which is a positive electrode power supply terminal, may represent a highest potential terminal, and the (−) high current tab 62, which is a negative electrode power supply terminal, may represent a lowest potential terminal. Further, a first opening 32a (e.g., a first through-hole) and a second opening 32b (e.g., a second through-hole) may be formed in the protection circuit module 30 such that the (+) high current tab 61 and the (−) high current tab 62 may pass through the first opening 32a and the second opening 32b, respectively, and may be connected thereto by soldering.

In some embodiments, the holder case 20 may be formed so as to expose the electrode terminals 11 of the plurality of battery cells 10. Further, the holder case 20 may include a first holder case 20a and a second holder case 20b formed to surround an upper end surface and a lower end surface (e.g., an upper surface and a lower surface) of the plurality of battery cells 10, respectively. The first holder case 20a and the second holder case 20b may improve durability of the battery pack against impact, fall, and vibrations from the outside.

Further, each of the first holder case 20a and the second holder case 20b may be provided with a first fastening opening 21 (e.g., a first fastening hole) in a region thereof, and the protection circuit module 30 may be provided with second fastening openings 33 corresponding to the first fastening openings 21. Accordingly, the protection circuit module 30 may be fixed to the first holder case 20a and the second holder case 20b by using the fastening members 50, which pass through the first fastening opening 21 and the second fastening opening 33.

Each of the plurality of battery cells 10 may be a cylindrical battery cell. However, the present invention is not limited thereto, and embodiments of the present invention may be modified to include various kinds of battery cells to which the connection tab 40 is suitable for the serial and/or parallel connection between adjacent ones of the battery cells 10.

Each of the battery cells 10 may include an electrode assembly formed of a positive electrode current collector, a negative electrode current collector, and a separator interposed between the positive electrode current collector and the negative electrode current collector. Each of the battery cells 10 may be provided with a positive electrode terminal and a negative electrode terminal, which are connected to the electrode assembly and exposed to the outside of the battery cell at both ends (e.g., opposite ends) thereof. The positive electrode terminal and the negative electrode terminal may correspond to the electrode terminals 11 described above.

The plurality of battery cells 10 may be adjacently disposed and connected to each other by the connection tabs 40 in serial or in parallel. In some embodiments, the body part 46 of the connection tab 40 and the electrode terminal 11 of the battery cell 10 may be connected to each other (e.g., electrically connected to each other) by welding. To connect the battery cells 10 to each other in serial, the electrode terminals 11 having different polarities from each other may be connected by the connection tab 40, and to connect the battery cells 10 to each other in parallel, the electrode terminals 11 having the same polarity as each other may be connected by the connection tab 40. In some embodiments, the connection tab 40 may be formed of a conductive material, such as copper and the like, to electrically connect the battery cells 10 to each other.

Figure 4:
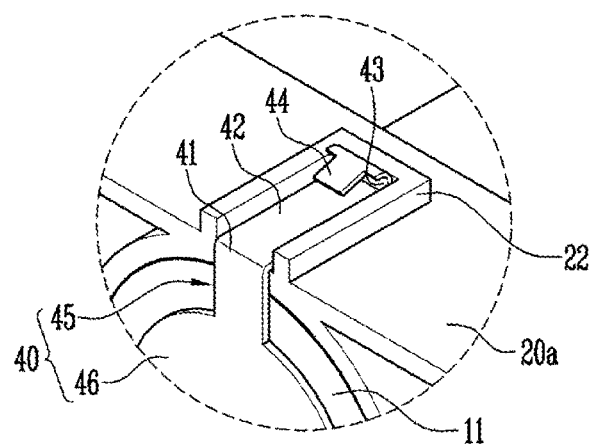
FIG. 4 is an enlarged view of the part A of FIG. 2.
Figure 5:
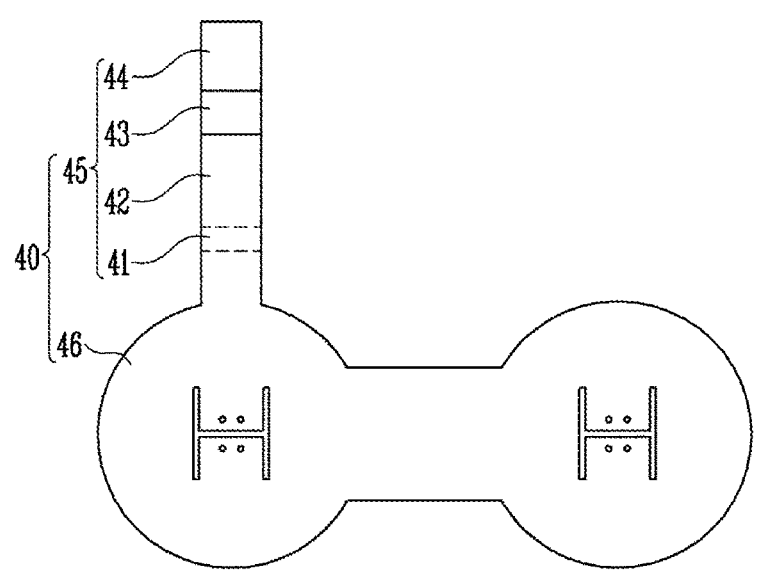
FIG. 5 is a top plan view of a connection tab according to an embodiment of the present invention.

FIG. 4 is an enlarged view of the part A of FIG. 2, and FIG. 5 is a top plan view of the connection tab 40 according to an embodiment of the present invention.

Referring to FIGS. 4 and 5, the connection tab 40, which electrically connects the plurality of battery cells 10 to each other, may include the body part 46 connected to the electrode terminals 11 of the plurality of battery cells 10 and the extended part 45 extended from the body part 46. The body part 46 may electrically connect adjacent ones of the battery cells 10 (e.g., two adjacent battery cells 10) to each other, and the extended part 45 extended from the body part 46 may be formed at a position corresponding to the cell voltage measuring terminal 31 (see, e.g., FIG. 3) of the protection circuit module 30.

In some embodiments, the extended part 45 may include a first bent portion 41, a seating portion 42, a second bent portion 43, and a tension portion 44 (e.g., a spring portion). The first bent portion 41 is bent in a direction from a surface parallel to the electrode terminal 11 of the battery cell 10 toward an external surface of the first holder case 20a, and the seating portion 42 may extend from the first bent portion 41 and be seated on an external surface of the first holder case 20a. Further, the second bent portion 43 may be bent from the seating portion 42 in a direction opposite to the direction in which the first bent portion 41 is bent, and the tension portion 44 may extend from the second bent portion 43 and be positioned on or over the seating portion 42.

In some embodiments, the tension portion 44 may be spaced from the seating portion 42 (e.g., may not contact the seating portion 42) by an interval, and thus, the connection tab 40 may be in tension. The protection circuit module 30 may be positioned on the holder cases 20a and 20b, and the protection circuit module 30 may be in close contact with the holder cases 20a and 20b due to the fastening members 50 (see, e.g., FIG. 2). Accordingly, even without a separate soldering structure or connection, the tension portion 44 of the connection tab 40 may be in close contact with the cell voltage measuring terminal 31 of the protection circuit module 30. For example, the connection tab 40 and the cell voltage measuring terminal 31 may be in contact with each other due to the tension in the connection tab 40, thereby electrically connecting the connection tab 40 with the cell voltage measuring terminal 31.

Further, the first holder case 20a may include a guide part 22 protruding in an upper direction along a periphery of the seating portion 42, except for a region of the seating portion 42 at where the first bent portion 41 is positioned. Accordingly, the first holder case 20a may guide the position of the extended part 45 of the connection tab 40 such that the extended part 45 may be easily seated in the seating portion 42 at the position corresponding to the cell voltage measuring terminal 31 of the protection circuit module 30. In these embodiments, the guide part 22 is shorter than the tension portion 44 (e.g., does not extend above the tension portion 44) of the extended part 45, and thus, the guide part 22 does not interfere with the tension portion 44 contacting the cell voltage measuring terminal 31.

Figure 6:
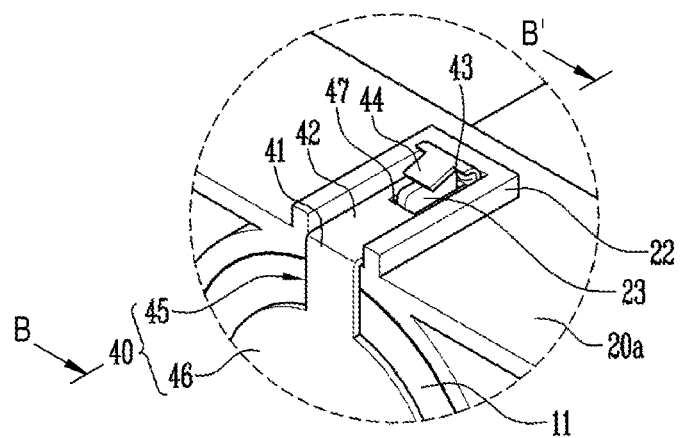
FIG. 6 is a perspective view illustrating a state in which a connection tab is seated on a holder case according to another exemplary embodiment of the present invention.
Figure 7:
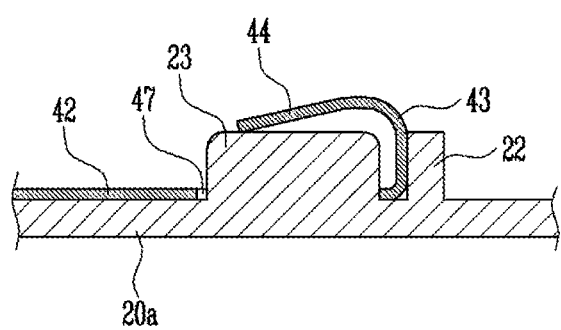
FIG. 7 is a cross-sectional view taken along the line B-B' of FIG. 6.

FIG. 6 is a perspective view illustrating a state where a connection tab is seated on a holder case according to another exemplary embodiment of the present invention, and FIG. 7 is a cross-sectional view taken along the line B-B' of FIG. 6.

Referring to FIGS. 6 and 7, an extended part 45 of a connection tab 40 may be seated in and aligned by a guide part 22 of a first holder case 20a, and in this embodiment, an insertion opening 47 (e.g., an insertion hole) may be formed in a region of a seating portion 42 of the connection tab 40.

Further, a rib 23 protruding in an upper direction may be provided on an external surface of the first holder case 20a at a position corresponding to the insertion opening 47 in the connection tab 40. The rib 23 may be inserted into the insertion opening 47 to more firmly fix the position of the extended part 45. In this embodiment, a height of the rib 23 may be the same as or greater than that of the guide part 22, thereby preventing the tension portion 44 from moving or bending to a position below the guide part 22 by the tension. For example, when the protection circuit module 30 applies pressure to the tension portion 44 at an upper side thereof such that the tension portion 44 is moved in a down direction, it is possible to ensure that the cell voltage measuring terminal 31 of the protection circuit module 30 and the tension portion 44 of the connection tab 40 contact each other.

The technical spirit of the present invention has been described, in detail, according to some exemplary embodiments, but the exemplary embodiments described herein are for purposes of illustration and do not limit the present invention. Further, those skilled in the art will appreciate that various modifications may be made therein without departing from the scope and spirit of the present invention.

The scope of the present invention is defined by the accompanying claims and their equivalents, is not restricted by the description of exemplary embodiments in the specification, and all changes and modifications belonging to the equivalent scope of the claims shall belong to the scope of the present invention.

What is claimed is:

1. A battery pack comprising:
    a plurality of battery cells arranged in parallel with each other, each of the battery cells comprising an electrode terminal at opposite ends thereof;
    a holder case configured to accommodate the battery cells;
    a protection circuit module mounted at an external side of the holder case and comprising:
        a main body; and
        a cell voltage measuring terminal on the main body and facing the holder case; and
    a connection tab comprising a body part electrically connected to the electrode terminals of a group of the battery cells and an extended part extended from the body part to contact and be electrically connected with the cell voltage measuring terminal of the protection circuit module due to tension in the extended part,
    wherein the main body of the protection circuit module at least partially covers the extended part of the connection tab.

2. The battery pack of claim 1, wherein the extended part comprises:
    a first bent portion extended from the body part and bent from a surface parallel to the electrode terminals toward an external surface of the holder case;
    a seating portion extended from the first bent portion and seated on the external surface of the holder case;
    a second bent portion bent from the seating portion in a direction opposite to a bending direction of the first bent portion; and
    a tension portion extended from the second bent portion and over the seating portion.

3. The battery pack of claim 2, wherein the tension portion is spaced from the seating portion.

4. The battery pack of claim 2, wherein the holder case comprises a guide part protruding in an upper direction along a periphery of the seating portion other than a region corresponding to the first bent portion.

5. The battery pack of claim 2, wherein the connection tab comprises an insertion opening in the seating portion thereof.

6. The battery pack of claim 5, wherein the holder case comprises a rib on the external surface of the holder case at a position corresponding to the insertion opening, and
    wherein the rib is in the insertion opening.

7. The battery pack of claim 1, wherein the holder case comprises a first fastening opening, and
    wherein the protection circuit module comprises a second fastening opening corresponding to the first fastening opening such that the protection circuit module is fixed to the holder case by a fastening member passing through the first fastening opening and the second fastening opening.

8. The battery pack of claim 1, wherein the holder case comprises a first holder case and a second holder case, each of which expose the electrode terminals of the battery cells and respectively extend over upper end surfaces and lower end surfaces of the battery cells.

9. The battery pack of claim 1, further comprising a high current tab,
    wherein the extended part of the connection tab is spaced from the high current tab.

10. The battery pack of claim 1, wherein the extended part comprises:
    a first bent portion extended from the body part and bent from a surface parallel to the electrode terminals toward the protection circuit module;
    a seating portion extended from the first bent portion and seated on an external surface of the holder case;
    a second bent portion bent from the seating portion toward the body part; and
    a tension portion extended from the second bent portion and over the seating portion.

11. The battery pack of claim 1, wherein the cell voltage measuring terminal in its entirety is located on the main body of the protection circuit module.

12. The battery pack of claim 1, wherein the extended part and the cell voltage measuring terminal are connected to each other without being welded to each other.

* * * * *